United States Patent Office 3,375,088
Patented Mar. 26, 1968

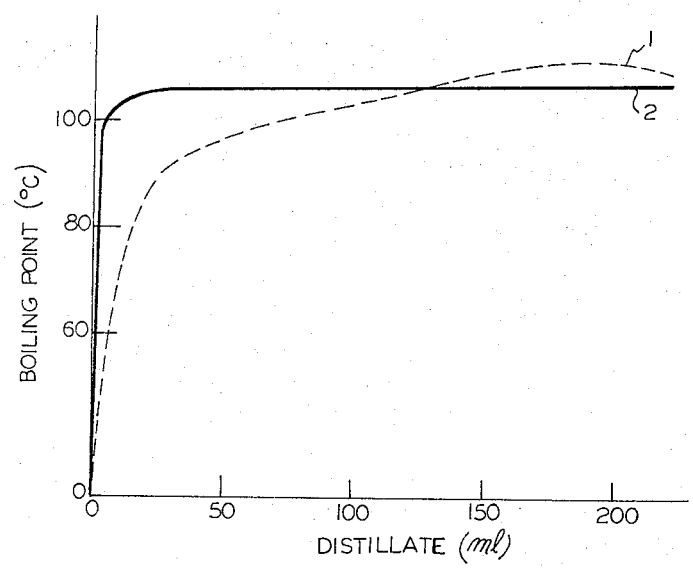

3,375,088
TREATMENT OF CRUDE CHLOROSULFURYL ISOCYANATE
Norio Onodera and Motohiko Nishide, Urawa-shi, Saitama-ken, and Hisao Takahashi, Kawagoe-shi, Saitama-ken, Japan, assignors to Nitto Chemical Industry Co., Ltd., Chiyoda-ku, Tokyo, Japan, and Zaidanhojin Nitto Rikagaku Kenkyujo, Urawa-shi, Saitama-ken, Japan
Filed Feb. 25, 1964, Ser. No. 347,233
2 Claims. (Cl. 23—359)

ABSTRACT OF THE DISCLOSURE

A process for purifying crude chlorosulfuryl isocyanate by contacting it with benzonitrile or a derivative thereof.

---

The present invention relates to a process for obtaining pure chlorosulfuryl isocyanate by treating crude chlorosulfuryl isocyanate with benzonitrile or a benzonitrile derivative.

As known, chlorosulfuryl isocyanate is an active compound derived from cyanogen chloride and sulfur trioxide as follows:

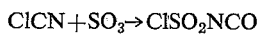

$$ClCN + SO_3 \rightarrow ClSO_2NCO$$

The compound is useful as raw materials for synthetic fibers, synthetic resins and agricultural chemicals or as intermediates for organic compounds.

From a reaction product of cyanogen chloride and sulfur trioxide, crude chlorosulfuryl isocyanate is collected as a liquid fraction above 100° C. but thus obtained crude chlorosulfuryl isocyanate has, even though a rectification is applied repeatedly, some width in boiling point and the amount of the fraction corresponding to pure chlorosulfuryl isocyanate, having a definite boiling point of 106–107° C. is very small. That is, even though a fraction having boiling points of 102–115° C. obtained by one rectification is rectified again, the width of the boiling points is not reduced. Therefore, it is impossible to purify it by distillation only.

In the case of using such a crude chlorosulfuryl isocyanate as a raw material as it is, there is a danger of causing unexpected side-reactions and it is uneconomical from an industrial view point to use only definite boiling point fraction obtained by rectification. It is profitable, therefore, to purify it by a treatment having reduced loss.

However, since chlorosulfuryl isocyanate has two functional radicals of —NCO and —Cl, it is fairly difficult to remove impurities contained in it by some chemical method without causing a reaction with the main material.

The inventors have found, as the results of earnest studies about the purification of chlorosulfuryl isocyanate, that benzonitrile and the derivatives thereof, such as, chlorobenzonitrile, nitrobenzonitrile, cyanotoluene, cyanoxylene, etc., that is, benzonitrile derivatives in which one or more hydrogen of benzene rings are replaced by one or more methyl, halogen or nitro radical, etc., are effective for the purification of crude chlorosulfuryl isocyanate.

According to the invention, crude chlorosulfuryl isocyanate is contacted with benzonitriles, that is crude chlorosulfuryl isocyanate is added slowly into benzonitrile or the benzonitrile derivative as mentioned above, or if the amount of benzonitrile or the derivative is small, it may be added into crude chlorosulfuryl isocyanate. By the addition heat is generated in some extent but when the system is allowed to stand for several hours, beautiful yellow rectangular crystals (melting point of the one derived from benzonitrile is 120–123° C.) are deposited. Further, after treating for a definite time the solution containing the crystals or the solution after being filtered is subjected to a vacuum treatment by suction and liquids having lower boiling points than those of benzonitriles used in the treatment are collected in a receiver cooled by an acetone-Dry Ice coolant. By distilling thus obtained liquids, chlorosulfuryl isocyanate having a constant boiling point of 106–107° C. is obtained. If necessary, after removing or not removing the crystals the product may be used as a benzonitrile solution of pure chlorosulfuryl isocyanate without the application of distillation. Also, if desired, chlorosulfuryl isocyanate may be separated from the benzonitrile solution by extraction.

In addition, the most preferable embodiment of this invention is a process wherein the crystals caused by impurities are formed completely and then the crystals are separated from chlorosulfuryl isocyanate, but the invention is not limited to the process. That is, chlorosulfuryl isocyanate may be recovered in any time after the reaction of benzonitriles and impurities is started.

Though the reason for the purification by the invention is not clear, it is assumed that benzonitrile or the derivative thereof reacts selectively with only impurities contained in the crude chlorosulfuryl isocyanate to form compounds having different properties than those of chlorosulfuryl isocyanate, and by subsequent treatments, e.g., only by separating the excess treating reagent and formed crystals, pure chlorosulfuryl isocyanate can be obtained.

In the accompanied drawing, the rectification boiling point curve 1 of crude chlorosulfuryl isocyanate is compared with the boiling point curve 2 of it treated with benzonitriles, and from the result the profitability of this invention will be clearly understood.

Further, the fact that impurities in crude chlorosulfuryl isocyanate are selectively removed is clear from the following also. That is, when a definite amount of crude chlorosulfuryl isocyanate is used and the amount of benzonitriles is changed variously, the amount of the pure chlorosulfuryl isocyanate obtained is constant as well as the amount of the deposited crystals is also constant. On the other hand, when a definite amount of benzonitriles is used the amount of crude chlorosulfuryl isocyanate is changed, the amount of obtained pure chlorosulfuryl isocyanate is proportional to the amount of the crude chlorosulfuryl isocyanate used.

Further, the crystalline products are deposited in proportion to the amount of the crude chlorosulfuryl isocyanate. From thus-mentioned experimental facts, it can be understood that the main material or chlorosulfuryl isocyanate does not take part in the reaction with the benzonitriles.

The amount of benzonitrile or the derivatives thereof may be very small if the amount of the impurities in chlorosulfuryl isocyanate is small, but considering from the operational facilitation, the preferable amount of the benzonitriles is above 1/10 weight parts based on the amount of crude chlorosulfuryl isocyanate.

Further, since chlorosulfuryl isocyanate is very reactive with water, it is necessary, in the case when it is dissolved in benzene, that benzene is dried thoroughly, e.g., by the treatment with metallic sodium.

On the other hand, the use of benzonitriles is very profitable in industry since they can be used sufficiently by only distilling them. Further, benzonitriles recovered after the treatment can be used repeatedly.

There are no particular limitations in the treating temperature if the system is kept to a liquid phase and in the reaction time, but it is preferable to let alone the reaction system above 24 hours in order to finish the reaction at the case of a room-temperature treatment. Also, the system is not necessarily heated, but the system may be heated up to the boiling state of chlorosulfuryl isocyanate in order to shorten the treating time. However, if necessary, the system may be treated at a temperature higher than the boiling point of chlorosulfuryl isocyanate or the boiling point of the benzonitrile or a derivative thereof.

The low boiling point portion or chlorosulfuryl isocyanate obtained after the treatment may be used as it is as the case may be. Also, in the case of re-distilling it, it can be used by the application of a simple distillation.

Treatment may, if desired, be carried out in an inert solvent. The solvent cannot have active hydrogen and ethylene double bond. Suitable one is, for example, aromatic, aliphatic saturated hydrocarbon, such as benzene, or halogenated saturated hydrocarbon, such as chloroform.

The examples of this invention are as follows:

Example 1

Into 10.8 parts of benzonitrile was added slowly with stirring 21.2 parts of crude chlorosulfuryl isocyanate (boiling point 102–115° C.) synthesized from cyanogen chloride and sulfur trioxide. The solution was colored in weak yellow with generating heat. After the solution was allowed to stand for about 2 hours, crystallization began to occur, and the solution was further let alone for 1 day at room temperature. The treated solution was distilled at a reduced pressure (20 mm. Hg) and the fractions distilled up to the inside temperature of 60° C. were collected in a collector cooled by acetone-Dry Ice. From thus collected solution was obtained 19.1 parts of pure chlorosulfuryl isocyanate having the boiling point of 106–107° C. by a simple distillation.

Example 2

To 21.2 parts of the crude chlorosulfuryl isocyanate as shown in Example 1 was added slowly 10.8 parts of benzonitrile and the solution was heated for 5 hours at 100° C. From the treated solution was obtained 19.3 parts of pure chlorosulfuryl isocyanate by the same process as in Example 1.

Example 3

To 21.2 parts of the crude chlorosulfuryl isocyanate as shown in Example 1 was added slowly 13 parts of p-chlorobenzonitrile at room temperature. The solution was heated to 100° C. with agitation and kept at the temperature for 1 hour, and then it was allowed to stand for 1 day at room temperature to deposit yellow crystals. From the treated solution was obtained 19.0 parts of pure chlorosulfuryl isocyanate by the same process as in Example 1.

Example 4

To 21.2 parts of the crude chlorosulfuryl isocyanate as shown in Example 1 was added slowly 10 parts of m-cyanotoluene and at once crystallization occurred. After the solution was allowed to stand for 1 day at room temperature, 18.5 parts of pure chlorosulfuryl isocyanate was obtained from the treated solution by the same process as in Example 1.

Example 5

To 10 parts of p-cyanotoluene was added slowly 21.2 parts of the crude chlorosulfuryl isocyanate as shown in Example 1. The solution was heated to 50° C. under stirring and maintained at the temperature for one hour. After the solution was allowed to stand for 1 day at room temperature, 19.2 parts of pure chlorosulfuryl isocyanate was obtained from the treated solution by the same process as in Example 1.

What is claimed is:

1. A process for treating crude chlorosulfuryl isocyanate which comprises contacting the crude chlorosulfuryl isocyanate with at least one compound selected from the group consisting of benzonitrile and the derivatives thereof in which at least one hydrogen of the benzene ring is substituted for a time sufficient to selectively react with the impurities contained in said crude chlorosulfuryl isocyanate.

2. A process according to claim 1 including the step of separating pure chlorosulfuryl isocyanate from the resulting reaction mixture.

References Cited

FOREIGN PATENTS 1,152,093  8/1963  Germany.

OTHER REFERENCES

Mellor: Comprehensive Treatise on Inorganic and Theoretical Chemistry, p. 266, vol. 10, 1930.

OSCAR R. VERTIZ, *Primary Examiner.*

H. S. MILLER, *Assistant Examiner.*